(12) United States Patent
Reich

(10) Patent No.: US 11,987,482 B2
(45) Date of Patent: May 21, 2024

(54) AIRCRAFT CARGO HANDLING SYSTEM WITH DISTRIBUTED ANTENNA SYSTEM AND MOBILE CARGO CONTROLLER

(71) Applicant: GOODRICH CORPORATION, Charlotte, NC (US)

(72) Inventor: Michael T. Reich, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 281 days.

(21) Appl. No.: 17/675,726

(22) Filed: Feb. 18, 2022

(65) Prior Publication Data
US 2023/0264933 A1  Aug. 24, 2023

(51) Int. Cl.
*B66F 9/075* (2006.01)
*B64D 9/00* (2006.01)
(Continued)

(52) U.S. Cl.
CPC ............ *B66F 9/07581* (2013.01); *B64D 9/00* (2013.01); *G05B 15/02* (2013.01); *H01Q 21/0006* (2013.01); *B64D 2009/006* (2013.01)

(58) Field of Classification Search
CPC . B64U 80/82; B64D 5/00; B64D 1/08; H01Q 1/2216; H01Q 1/28; H01Q 13/203; H01Q 21/0006; H01Q 21/28; H01Q 13/20; H01Q 1/3275; H01Q 13/22; H01Q 21/005; H01Q 21/068; H01Q 21/08; H01Q 1/3291; H01Q 21/20; H01Q 1/3283; H01Q 1/2225; H01Q 1/2241; H01Q 1/3225; H01Q 1/3233; H01Q 15/0086; H01Q 7/00; H01Q 1/32; H01Q 21/0025; H01Q 21/064; H04B 17/345; H04B 5/28; H04B 7/18506; H04B 7/1555; H04W 64/00; H04W 84/005; H04W 12/06; H04W 12/12;
(Continued)

(56) References Cited

U.S. PATENT DOCUMENTS

| 7,198,227 B2 | 4/2007 | Olin et al. |
| 8,565,758 B2 | 10/2013 | Owyang et al. |

(Continued)

FOREIGN PATENT DOCUMENTS

WO  2021032550  2/2021

OTHER PUBLICATIONS

W.L. Gore & Associates, "Gore Leaky Feeder Antennas: Improve In-Flight Connectivity to Wireless Networks," gore.com, Copyright 2013, W.L. Gore & Associates GmbH, PLFWI2131, Rev A 01-13, pp. 1-4.

*Primary Examiner* — Monica C King
(74) *Attorney, Agent, or Firm* — SNELL & WILMER L.L.P

(57) ABSTRACT

A cargo handling system that utilizes a distributed antenna system for a cargo bay or compartment is disclosed. A cargo deck within the cargo bay may incorporate a plurality of power drive units. A mobile cargo controller may wirelessly communicate with the distributed antenna system to control movement of a ULD into/out of/within the cargo bay. A base station may be operatively interconnected with both the distributed antenna system and the plurality of power drive units (e.g., directly or indirectly via a control system, such as a control panel).

20 Claims, 13 Drawing Sheets

(51) Int. Cl.
*G05B 15/02* (2006.01)
*H01Q 21/00* (2006.01)

(58) Field of Classification Search
CPC ... H04W 12/122; H04W 12/64; H04W 16/20; H04W 24/00; H04W 48/02; H04W 16/14; H04W 92/02; H04W 84/00; H04W 84/02; H04W 88/085; B66F 9/07581; B66F 9/06; B60R 25/2072; B60R 25/245; B60R 2325/105; B60C 23/0444; G01N 2291/014; G01N 29/036; G01N 2015/0846; G01N 22/04; G01N 29/2481; G01N 33/0047; B60P 3/07
See application file for complete search history.

(56) References Cited

U.S. PATENT DOCUMENTS

| | | |
|---|---|---|
| 9,022,208 B2 | 5/2015 | Huber |
| 9,740,897 B1 | 8/2017 | Salour et al. |
| 10,181,060 B2 | 1/2019 | Krug et al. |
| 10,604,228 B2 | 3/2020 | Harms et al. |
| 11,010,025 B2 | 5/2021 | Balasubramanian et al. |
| 2009/0167321 A1* | 7/2009 | Krueger .............. H04B 17/345 343/703 |
| 2011/0195656 A1* | 8/2011 | Owyang ................. H01Q 1/28 244/119 |
| 2023/0242271 A1* | 8/2023 | Bosma .................... B64D 1/06 244/195 |
| 2023/0264933 A1* | 8/2023 | Reich ....................... B64D 9/00 244/171.3 |
| 2023/0417685 A1* | 12/2023 | Jardine ................. G01N 22/04 |

\* cited by examiner

AIRCRAFT CARGO HANDLING SYSTEM WITH DISTRIBUTED ANTENNA SYSTEM AND MOBILE CARGO CONTROLLER

FIELD

The present disclosure generally relates to the field of cargo handling systems and, more particularly, to using a mobile cargo controller to control movement of objects within a cargo bay or compartment.

BACKGROUND

Wireless control of aircraft cargo handling has several advantages when compared with a traditional wired control system. These include reduced hardware (fewer control panels), reduced harnessing, and reduced operating crew. Operator reduction is achievable due to the ability for a single operator to position themselves freely wherever necessary during loading and unloading operations rather than being tied to a fixed panel location.

The typical wireless control system for this scenario would typically consist of a handheld wireless controller and a wireless base station connected to a single fixed antenna. The operator would execute commands using the handheld wireless controller while moving about the cargo compartment. These commands would be transmitted wirelessly from the handheld controller to the base station, where the base station would pass them on to the cargo handling control system via a standard wired serial interface.

Determining the correct placement of the base station antenna in the above-described configuration is critical to insure reliable operation. However, a typical wireless link with a single fixed antenna on the wireless base station will have difficulty performing well under all conditions and operating scenarios within the cargo compartment. RF channel impairments such as scattering from irregular floor surfaces, multipath reflections from sidewalls, and signal attenuation/shadowing from palletized and containerized cargo make a single fixed antenna a poor solution for this application.

The best reception between a pair of radios will occur along a straight line between the transmitter and the receiver. This desirable line-of-site between an operator, using a handheld wireless controller, and the single fixed antenna may be blocked by cargo within the cargo compartment. While line-of-site could possibly be established by the operator moving to a different location within the cargo compartment, this could potentially place them in an unsafe position near or in front of the container they wish to move. Shadowing of this nature at some point in a cargo load/unload operation is probable no matter where the single fixed antenna is placed within the cargo compartment. Multipath reflections can also degrade the quality of the wireless link. Scattering from rough surfaces such as the cargo compartment deck can introduce multipath effects that are difficult to predict and highly dependent on the relative position of the transmitter and receiver.

SUMMARY

A cargo handling system is presented herein. Both the configuration of such a cargo handling system and the operation of such a cargo handling system are within the scope of this Summary.

A cargo handling system may be used in conjunction with a cargo bay or compartment (e.g., of an aircraft), for instance to at least one of load cargo into the cargo bay and to unload cargo from the cargo bay. One or more unit load devices or ULDs may be disposed within the cargo bay. A mobile cargo controller may be used by one or more operators/loaders to move ULDs into the cargo bay (a loading operation), within the cargo bay (a loading operation and/or an unloading operation), or out of the cargo bay (an unloading operation).

A "ULD", as used herein, includes a container, pallet, or other cargo of any size, shape, configuration, and/or type. A "mobile cargo controller", as used herein, includes a portable and/or hand-held device that may be moved throughout the cargo bay (as well as outside of the cargo bay for that matter) and includes one or more actuators (e.g., buttons; a joystick) for moving a ULD in a desired manner.

In one aspect a cargo bay includes a cargo deck, a first sidewall, and a second sidewall, with the first sidewall and the second sidewall each having a length dimension that coincides with a first dimension and with the first sidewall and the second sidewall being spaced from each other in a second dimension that defines a width dimension of the cargo bay. A cargo deck within the cargo bay incorporates a plurality of power drive units. A central longitudinal region (e.g., a region within about 1 foot of each side of a central longitudinal axis of the cargo bay that is positioned midway between the first sidewall and the second sidewall) is disposed between the first and second sidewalls in the second dimension and has its length extending in the first dimension. A distributed antenna system includes a first antenna and a second antenna (e.g., at least two antennas) that are each disposed in the central longitudinal region, with the first and second antennas occupying different positions in the first dimension. A base station is operatively interconnected with each of the first antenna, the second antenna, and the plurality of power drive units.

Another aspect is directed to operating a cargo handling system. A command is issued from a mobile cargo controller that is at a first location (e.g., relative to a cargo bay), where the command pertains to moving a first ULD in a certain manner. A first line-of-site communication path between the mobile cargo controller and a first antenna of a distributed antenna system is obstructed at the time the command is issued from the mobile cargo controller. However, an unobstructed second line-of-site communication path exists between the mobile cargo controller and the second antenna at the time the command is issued from the mobile cargo controller. As such, the command from the mobile cargo controller, transmitted or relayed by the second antenna of the distributed antenna system, is used to move the first ULD.

Various aspects of the present disclosure are also addressed by the following examples and in the noted combinations:

1. A cargo handling system, comprising:
   a cargo bay comprising a cargo deck, a first sidewall, and a second sidewall, wherein said first sidewall and said second sidewall each have a length dimension that coincides with a first dimension, wherein said first sidewall and said second sidewall are spaced from each other in a second dimension that corresponds with a width dimension of said cargo bay;
   a plurality of power drive units associated with said cargo deck;
   a central longitudinal region location between said first and second sidewalls in said second dimension and extending longitudinally in said first dimension;
   a distributed antenna system comprising a first antenna and a second antenna that are each disposed in said central longitudinal region and that are separate antennas, wherein said first antenna and said second antenna occupy different positions in said first dimension; and
a base station operatively interconnected with each of said first antenna, said second antenna, and said plurality of power drive units.

2. The cargo handling system of example 1, wherein said first antenna and said second antenna are disposed at least generally on a central longitudinal axis of said cargo bay that extends along said central longitudinal region in said first dimension.

3. The cargo handling system of any of examples 1-2, wherein said first antenna and said second antenna are disposed in non-overlapping relation in said first dimension.

4. The cargo handling system of any of examples 1-3, wherein said first antenna and said second antenna are spaced from each other in said first dimension.

5. The cargo handling system of any of examples 1-4, wherein said first antenna and said second antenna are each selected from the group consisting of monopole, dipole, slot, or patch antennas.

6. The cargo handling system of any of examples 1-5, wherein said first antenna, said second antenna, and said base station are connected in series.

7. The cargo handling system of any of examples 1-5, further comprising:
a signal splitter/combiner;
a first series connection between said signal splitter/combiner and said first antenna;
a second series connection between said signal splitter/combiner and said second antenna; and
a third series connection between and said signal splitter/combiner and said base station.

8. The cargo handling system of example 7, further comprising:
a cargo bay access opening to said cargo bay; and
a third antenna disposed at said cargo bay access opening and a separate antenna from said first and second antennas, wherein said distributed antenna system further comprises said third antenna.

9. The cargo handling system of example 8, wherein said third antenna is disposed between said signal splitter/combiner and said base station in said third series connection.

10. The cargo handling system of any of examples 1-5, further comprising:
a cargo bay access opening to said cargo bay; and
a third antenna disposed at said cargo bay access opening and a separate antenna from said first and second antennas, wherein said distributed antenna system further comprises said third antenna.

11. The cargo handling system of example 10, wherein said third antenna is operatively interconnected with said base station.

12. The cargo handling system of any of examples 1-3, wherein said first antenna and said second antenna are each a leaky feeder antenna.

13. The cargo handling system of example 12, wherein each of said first antenna and said second antenna have a length dimension that extends in said first dimension.

14. The cargo handling system of any of examples 12-13, further comprising:
a signal splitter/combiner, wherein each of said first antenna and said second antenna are operatively connected with said signal splitter/combiner; and
a series connection between and said signal splitter/combiner and said base station.

15. The cargo handling system of any of examples 1-14, wherein said cargo bay further comprises a roof, and wherein said first antenna and said second antenna are each mounted to said roof.

16. The cargo handling system of any of examples 1-15, wherein said base station excludes a user interface.

17. The cargo handling system of any of examples 1-16, further comprising:
a mobile cargo controller in communication with said distributed antenna system.

18. The cargo handling system of example 17, wherein said mobile cargo controller is in wireless communication with said distributed antenna system.

19. The cargo handling of any of examples 17-18, further comprising a control system operatively interconnected with said base station, wherein said control system provides said operative interconnection between said base station and said plurality of power drive units, and wherein all communications between said distributed antenna system and said control system are provided through said base station.

20. A method of operating a cargo handling system, comprising:
issuing a command, from a first location and using a mobile cargo controller, to move a first unit load device (ULD) within a cargo bay;
obstructing a first line-of-site communication path between said mobile cargo controller and a first antenna of a distributed antenna system during said issuing;
transmitting said command from said mobile cargo controller to a second antenna of said distributed antenna system using a second line-of-site communication path between said mobile cargo controller and said second antenna that is unobstructed; and
moving said first ULD, within said cargo bay, using said command relayed by said second antenna.

21. The method of example 20, wherein said first location is one of inside said cargo bay and outside said cargo bay.

22. The method of example 20, wherein said first location is outside of said cargo bay, and wherein said second antenna is at a cargo bay access opening to said cargo bay.

23. The method of any of examples 20-22, wherein said obstructing comprises a second ULD being positioned within said cargo bay in said first line-of-site communication path between said mobile cargo controller and said first antenna.

24. The method of any of examples 20-23, wherein said relaying comprises transmitting said command from said second antenna to a base station, wherein said moving is executed in response to said base station receiving said command from said second antenna.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

Figure 1A:
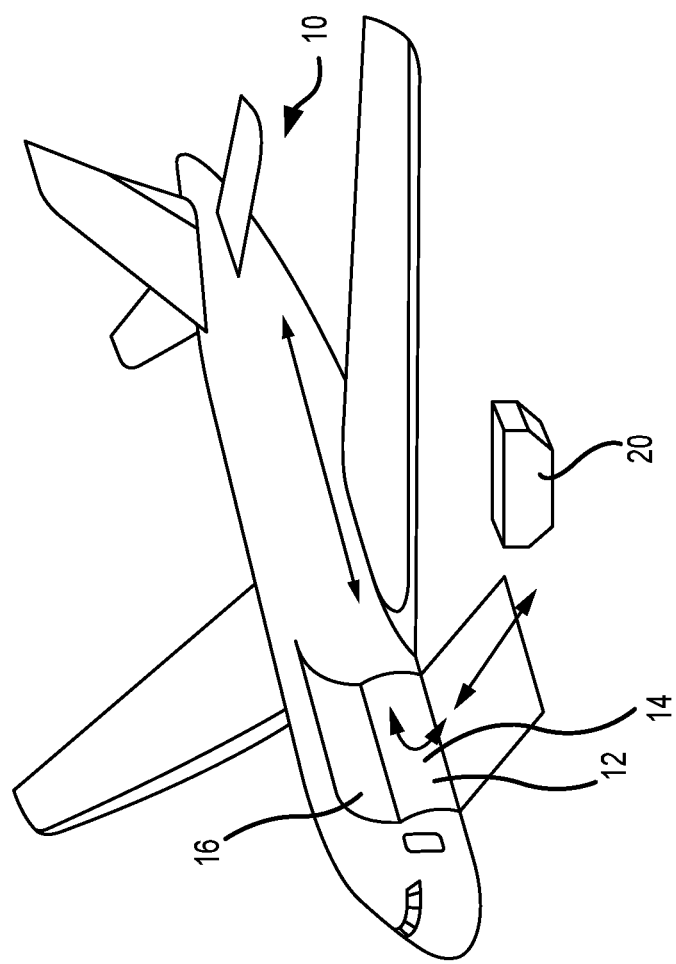
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
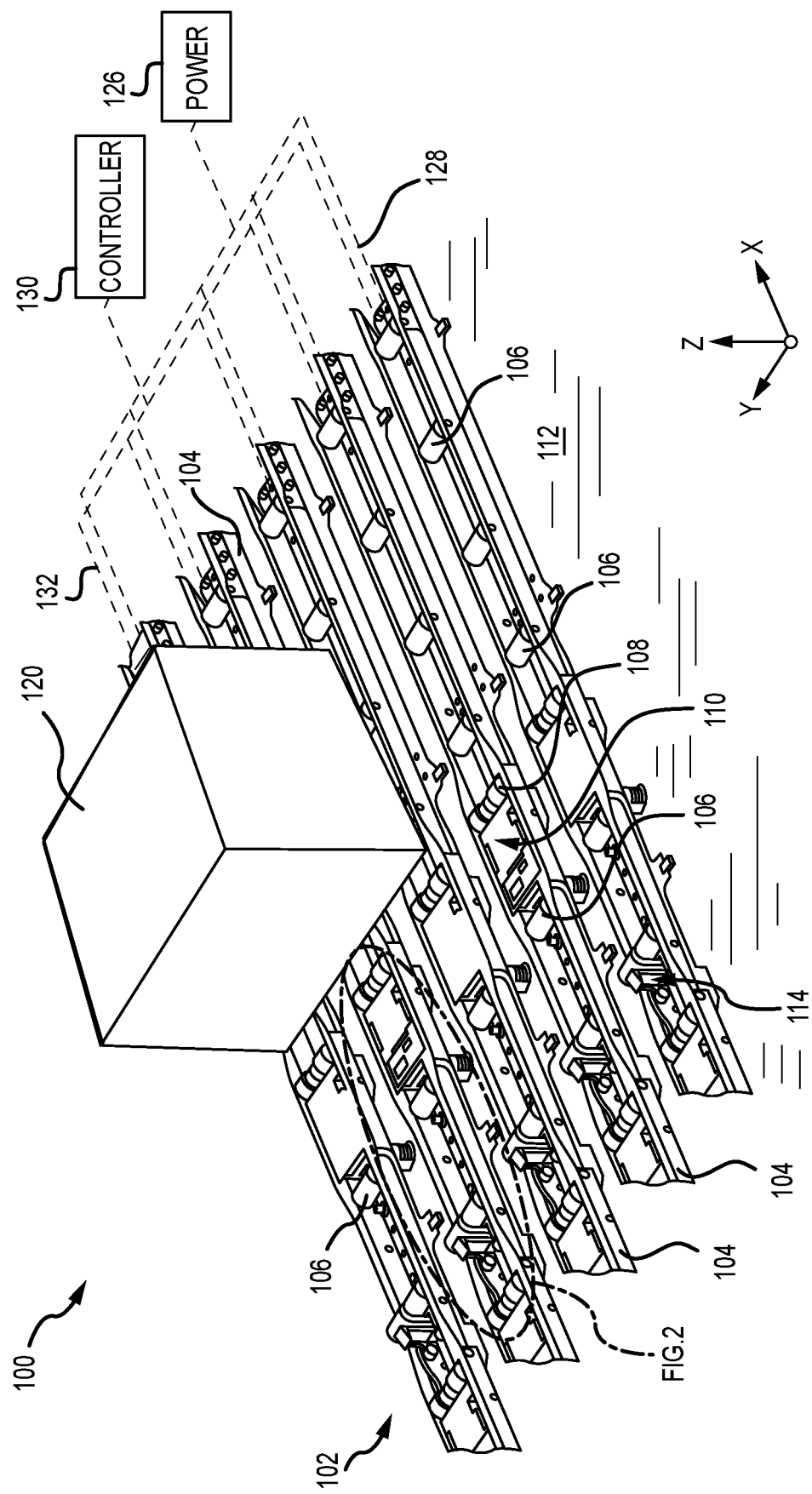
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112— e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102.

Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
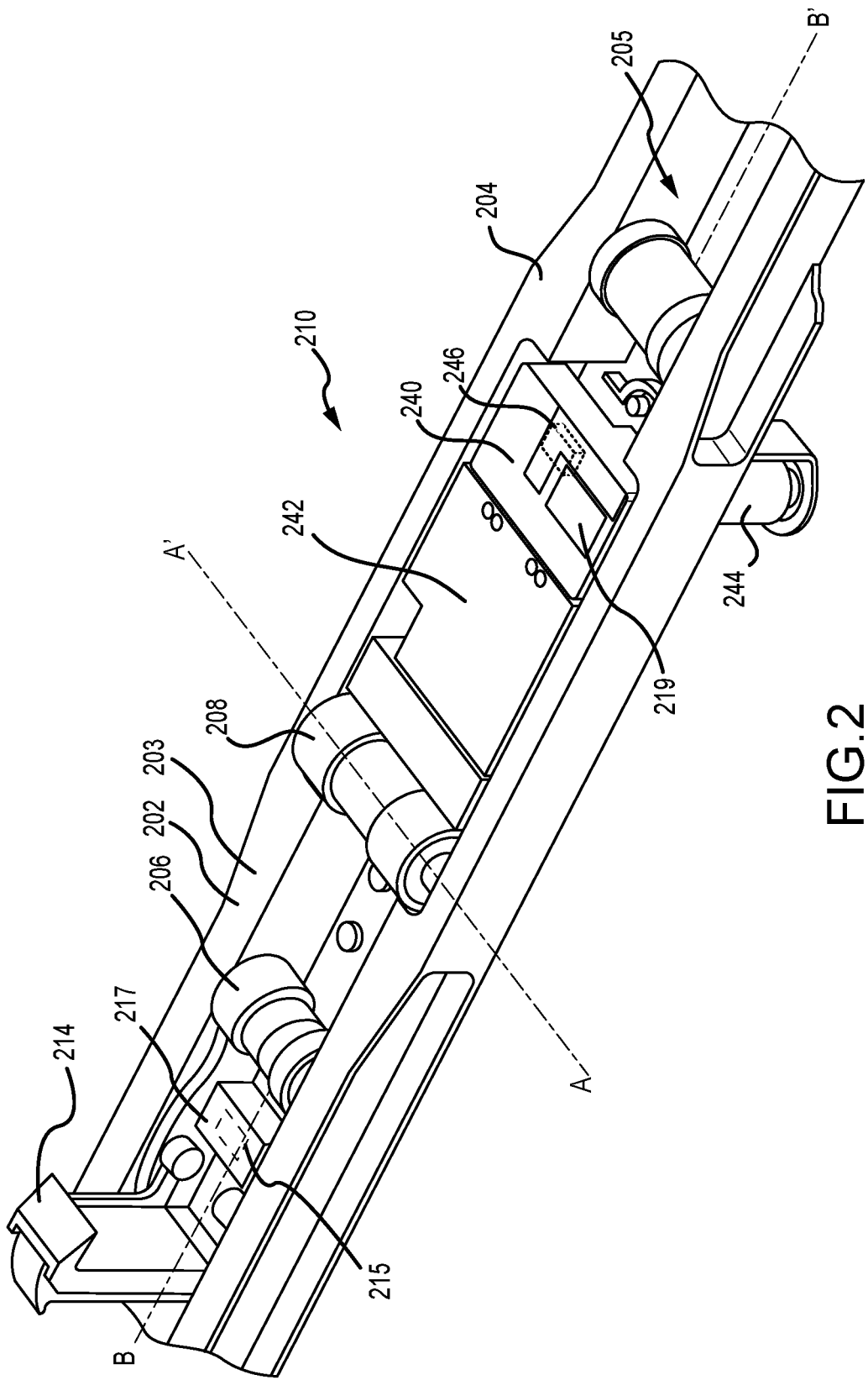
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
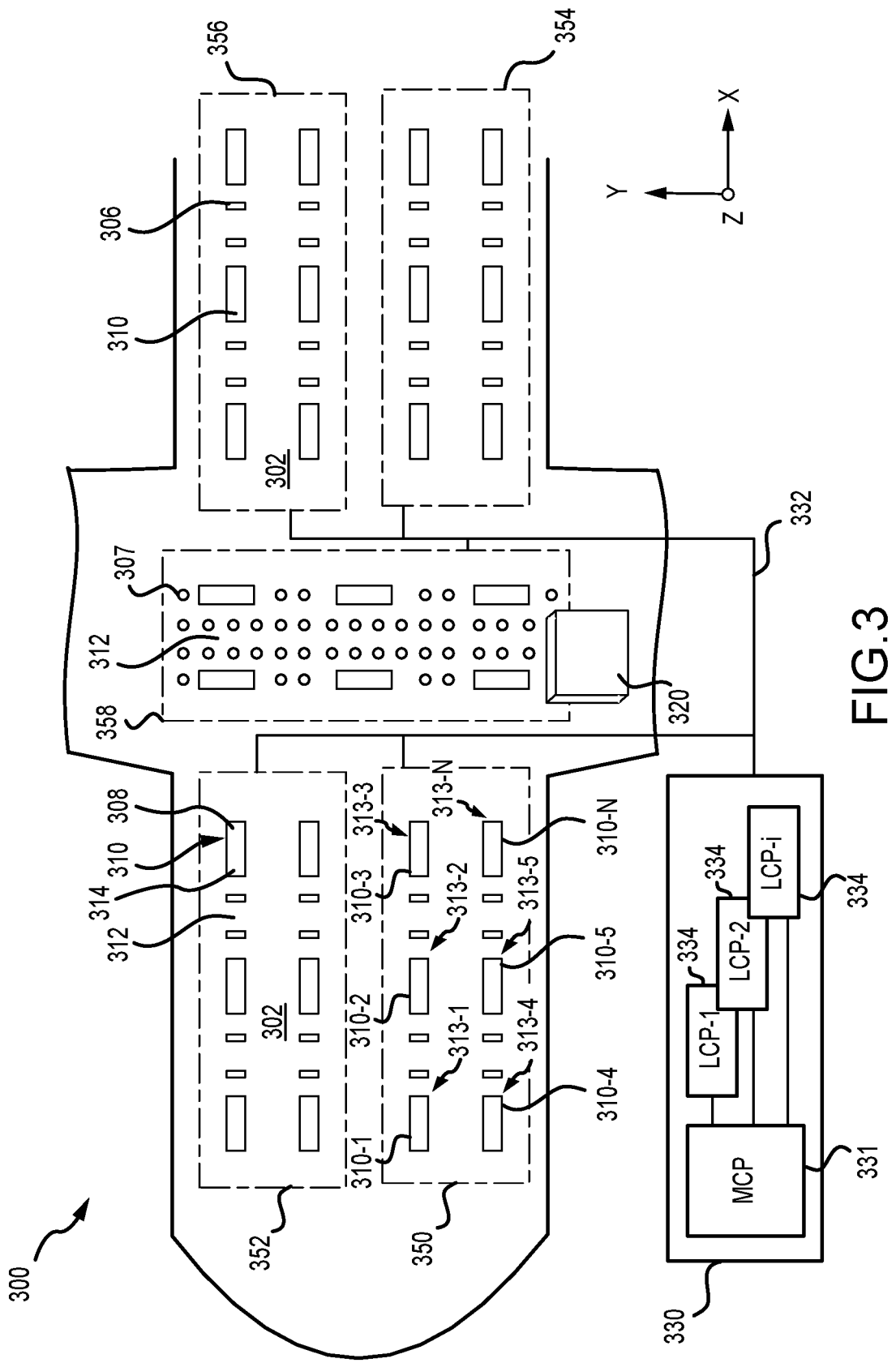
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 313-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4:
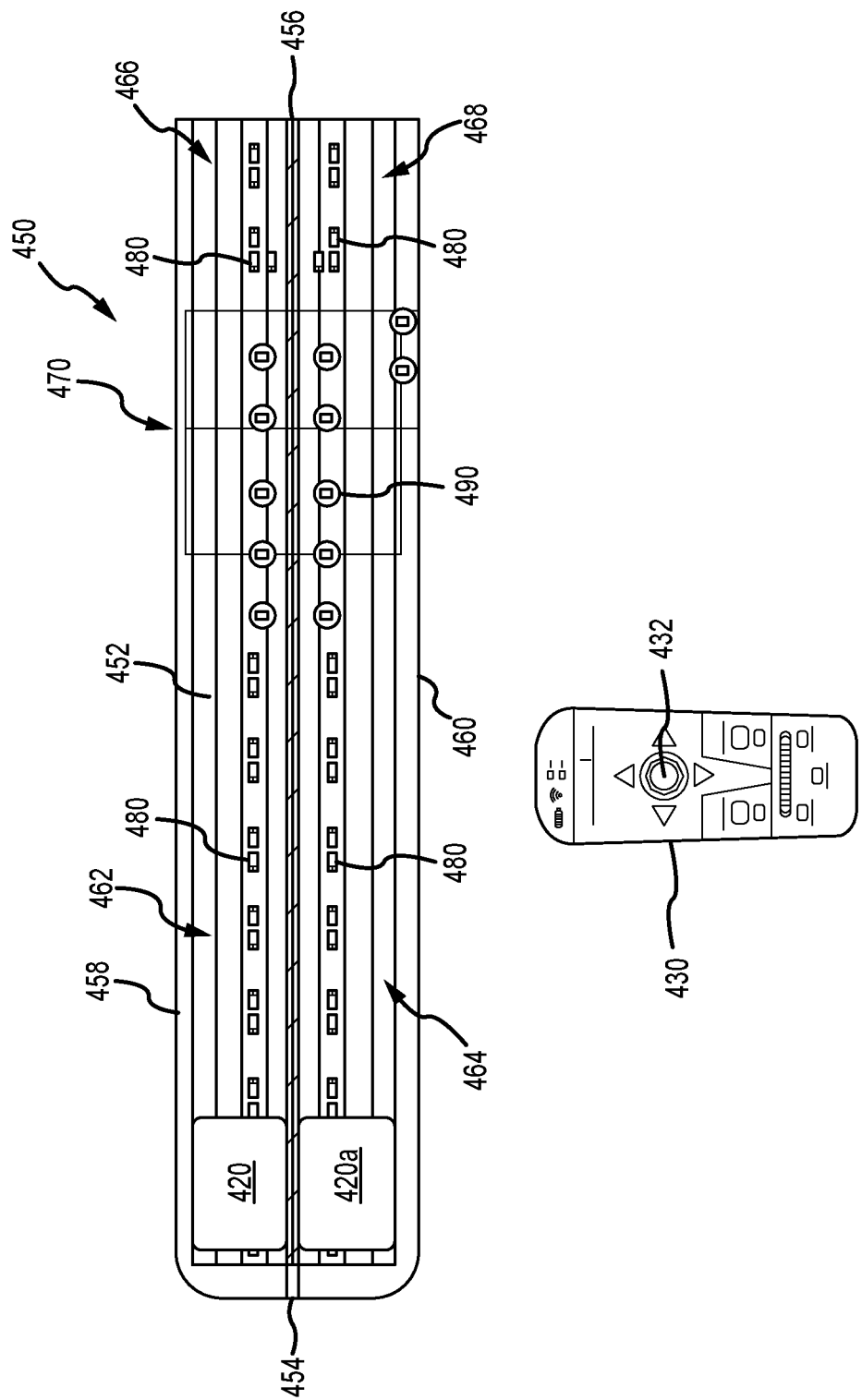
FIG. 4 illustrates a mobile cargo controller in relation to a cargo compartment, in accordance with various embodiments.

FIG. 4 illustrates a mobile cargo controller 430 in relation to a representative cargo compartment 450 (e.g., for an aircraft). The mobile cargo controller 430 includes a cargo motion controller 432 (e.g., a joystick; one or more buttons). Moving the cargo motion controller 432 will produce a corresponding movement of a corresponding container 420 (e.g., a ULD), for instance container 420a, along a deck 452 of the cargo compartment 450.

The cargo compartment 450 of FIG. 4 is defined by a forward end 454, an aft or rear end 456 that is spaced from the forward end 454 along a length (or longitudinal) dimension of the cargo compartment 450, a right side 458, and a left side 460 that is spaced from the right side 458 along a width (or lateral) dimension of the cargo compartment 450. The cargo compartment 450 may be characterized as including a plurality of separate cargo zones, including a forward-right cargo zone 462, a forward-left cargo zone 464, an aft-right cargo zone 466, and an aft-left cargo zone 468. The cargo compartment 450 may also be characterized as including a doorway zone 470 (e.g., for loading cargo into and unloading cargo from the cargo compartment 450) that is disposed between a forward cargo compartment (collectively cargo zones 462, 464) and an aft cargo compartment (collectively cargo zones 466, 468).

The deck 452 of the cargo compartment 450 may include a plurality of PDUs 480 (e.g., for advancing cargo along an at least generally axial/linear path relative to the cargo deck 452; e.g., in accord with PDU 210 of FIG. 2 and/or PDUs 310 of FIG. 3), as well as a plurality of freighter common turntables or FCTs 490 that are a specific type of PDU (having the ability to axially advance associated cargo, as well as to rotate associated cargo). The FCTs 490 are disposed in the doorway zone 470 of the cargo compartment 450.

Figure 5:
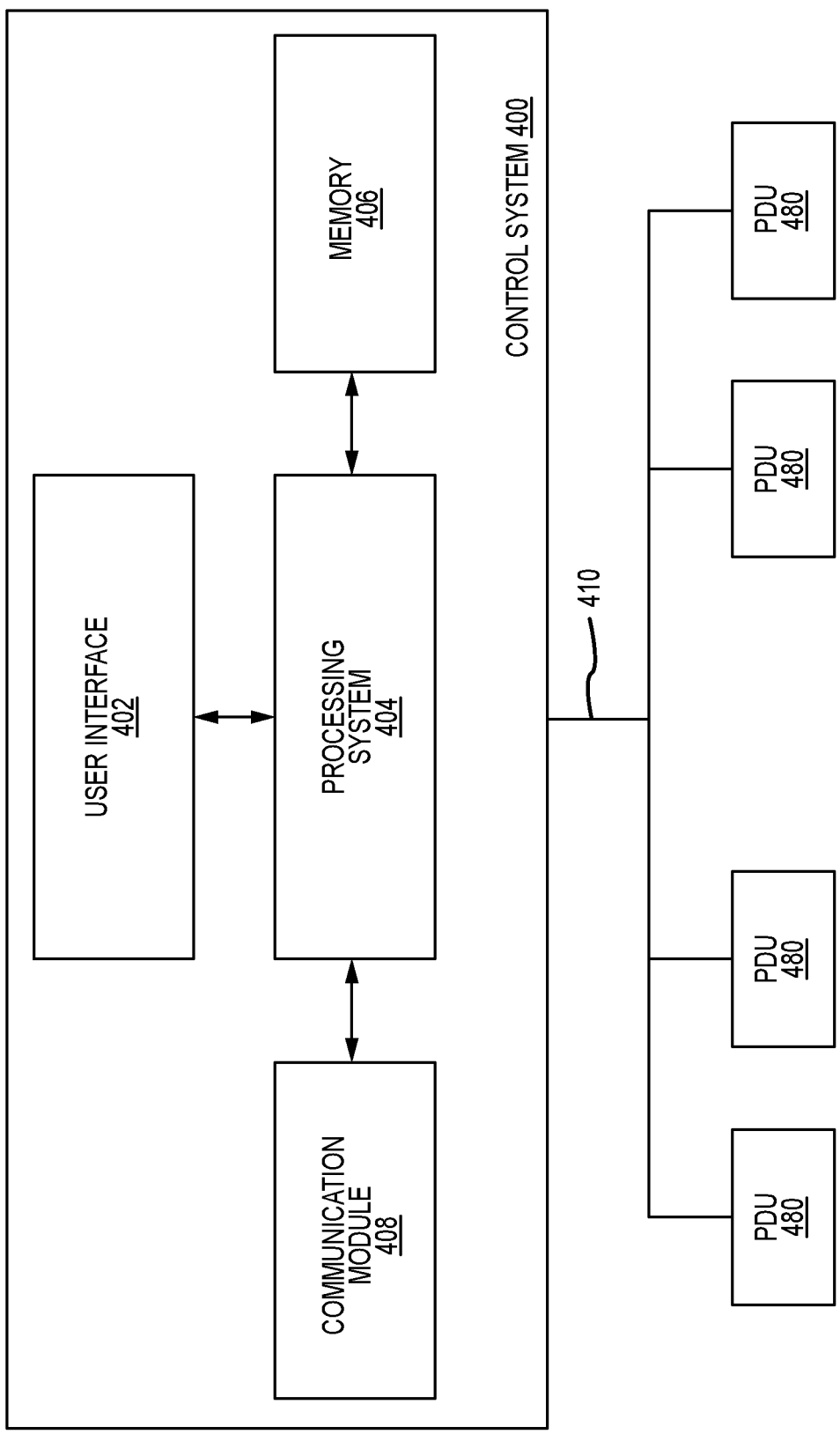
FIG. 5 is a functional schematic of a control system for a cargo handling system, in accordance with various embodiments.

A control system or system controller for a cargo handling system is illustrated in FIG. 5 is identified by reference numeral 400. The control system 400 may be incorporated in any appropriate manner, including without limitation on a distributed basis. For instance, all or a portion of the control system 400 may be incorporated by one or more of a master control panel for the cargo compartment 450, a local control panel for the cargo compartment 450, or the mobile cargo controller 430.

The control system 400 includes a user interface 402 of any appropriate type (e.g., a monitor, a keyboard, a mouse, a touchscreen), a processing system 404 (e.g., a central processing unit; one or more processors or microprocessors of any appropriate type and utilizing any appropriate processing architecture and including a distributed processing architecture), memory 406, and a communication module 408 of any appropriate configuration and/or modality (e.g., to accommodate communications between the control system 400 and at least one of the mobile cargo controller 430 and relevant PDUs 480 in the cargo compartment 450). Any appropriate communication link 410 may be provided between the control system 400 and each of the various PDUs 480 and the cargo compartment 450 (e.g., wired or wireless).

Figure 6:
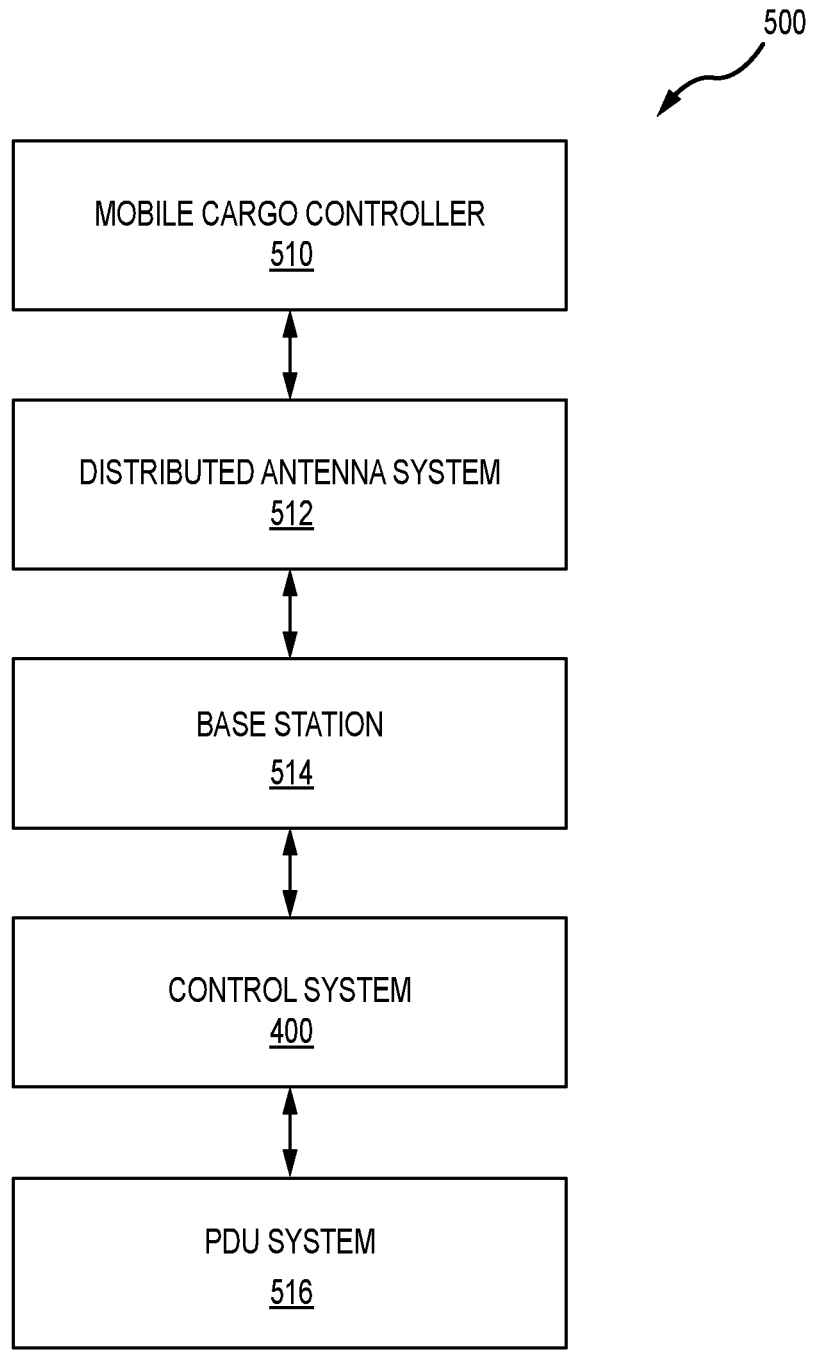
FIG. 6 is a functional schematic of a cargo handling system that uses a distributed antenna system, in accordance with various embodiments.

A cargo handling or loading system is illustrated in FIG. 6 and is identified by reference numeral 500. The cargo handling system 500 includes a mobile cargo controller 510 (e.g., in accord with the mobile cargo controller 430 of FIG. 4), a distributed antenna system 512 located within a cargo compartment or bay (e.g., cargo bay 520 of FIGS. 7-8; cargo bay 520a of FIG. 9; cargo bay 520b of FIG. 10; cargo bay 520c of FIG. 11), and a base station 514. The mobile cargo controller 510 communicates (e.g., wirelessly) with the base station 514 through the distributed antenna system 512. Additional components of the cargo handling system 500 include a PDU system 516 having a plurality of the above-noted PDUs 480, 490 of FIG. 4 appropriately distributed throughout the cargo compartment or bay, along with a control system 400 that is operatively interconnected with the various PDUs to control operation of relevant PDUs 480, 490 to move cargo (e.g., one or more ULDs) throughout the cargo compartment or bay. The control system 400 may be implemented in any appropriate manner by a cargo compartment or bay that incorporates the cargo handling system 500.

Figure 7:
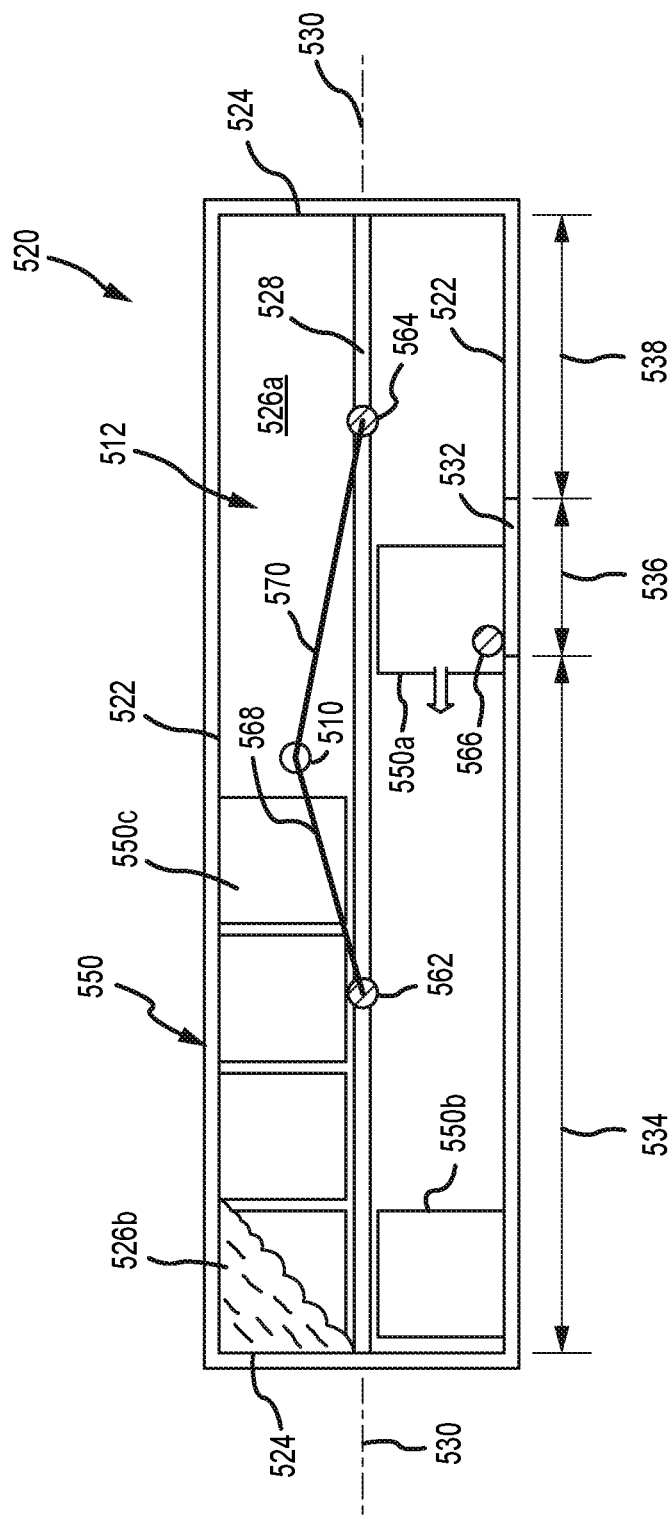
FIG. 7 is a schematic of a cargo bay that incorporates a distributed antenna system for a cargo handling system and with a representative ULD load configuration, in accordance with various embodiments.

A cargo bay or compartment is illustrated in FIG. 7, is identified by reference numeral 520, and may utilize the cargo handling system 500 of FIG. 6 (e.g., the cargo bay 520 may utilize a plurality of PDUs 480, 490 of the type/arrangement discussed above with regard to the cargo compartment 450 of FIG. 4). A single base station 514 may be provided for the cargo bay 520, and this base station 514 may be disposed at any appropriate location relative to the cargo bay 520. The base station 514 may be configured without a user interface. However and as discussed above with regard to FIG. 6, the base station 514 is in communication with the control system 400, which in turn communicates with the PDU system 516 and with the control system 400 including a user interface 402 for providing user input to the cargo handling system 500.

FIG. 7 illustrates a representative loading configuration of ULDs 550 within the cargo bay 520. The cargo bay 520 includes a pair of sidewalls 522 that extend along a length of the cargo bay 520 in a first or a longitudinal dimension 552 and that are spaced from one another in a second or lateral dimension 554 (e.g., the spacing between the sidewalls 522 may define a width of the cargo bay 520). A pair of end walls 524 are spaced from one another in the first dimension 552, with each end wall 524 extending between and interconnecting the sidewalls 522. The cargo bay 520 includes a deck 526a on which one or more ULDs 550 may be disposed, along with a roof 526b that is spaced from the cargo deck 526a in a dimension that is orthogonal to a reference plane that contains both the first dimension 552 and the second dimension 554. The sidewalls 522, the end walls 524, the deck 526a, and the roof 526b may define a perimeter of the cargo bay 520 and/or an enclosed space for the ULDs 550. Access to this enclosed space may be provided by a cargo bay access opening 532. A door (e.g., cargo load door 16 in FIG. 1A) may be utilized to open and close this cargo bay access opening 532.

A central longitudinal axis 530 of the cargo bay 520 may extend longitudinally in the first dimension 552, may be disposed midway between the sidewalls 522 in the second dimension 554, and may be disposed within a central region or a central longitudinal region 528 of the cargo bay 520 having a length that also extends longitudinally between the pair of end walls 524 in the first dimension 552. The cargo bay 520 may be characterized as having a first cargo region 534 (e.g., a forward cargo region), a second cargo region 536 (e.g., a doorway region), and a third cargo region 538 (e.g., an aft cargo region).

The mobile cargo controller 510 of the cargo handling system 500 (FIG. 6) may be used to control movement of ULDs 550 within the cargo bay 520 via wireless communications with the distributed antenna system 512 and using the control system 400 of FIGS. 5-6. A first antenna 562 of the distributed antenna system 512 is disposed within the central longitudinal region 528 (including on the central longitudinal axis 530) and the first cargo region 534. A second antenna 564 of the distributed antenna system 512 is disposed within the central longitudinal region 528 (including on the central longitudinal axis 530) and the third cargo region 538. A third antenna 566 of the distributed antenna system 512 is disposed within the second cargo region 536 (e.g., within the cargo bay access opening 532). Each of the antennas 562, 564, 566 may be mounted on the roof 526b within the interior of the cargo bay 520 and at the noted locations. Representative antenna types/configurations for the antennas 562, 564, 566 include without limitation monopole, dipole, slot, and/or patch antennas.

Any appropriate number of separate antennas may be used by the distributed antenna system 512. Each adjacent pair of antennas of the distributed antenna system 512 may be appropriately spaced, such as a spacing within a range from about 10 feet to about 40 feet. Each separate antenna of the distributed antenna system 512 may be operatively interconnected with the base station 514 in any appropriate manner, including where a separate transmission line extends between the base station 514 and each of the individual antennas of the distributed antenna system 512. Any appropriate number of multiple antennas (e.g., 2-4 antennas) may be disposed in the central longitudinal region 528, spaced along the first dimension 552, and with each such antenna being within about 1 foot of the central longitudinal axis 530 (e.g., the width of the central longitudinal region 528, measured in the second dimension 554, may be about 2 feet along its entire length in the first dimension 552), for instance depending upon the length of a given cargo bay 520.

With regard to using the mobile cargo controller 510 to move a ULD 550a within the cargo bay 520, in the direction indicated by the arrow in FIG. 7, and toward a ULD 550b, there is an unobstructed line-of-site communication path 570 between the third antenna 566 of the distributed antenna system 512 and the mobile cargo controller 510 that may be used to control operation of the relevant PDUs of the PDU system 516 via the control system 400 (FIG. 6). Note, however, that there is an obstructed line-of-site communication path 568 between the mobile cargo controller 510 and the first antenna 562 (via the ULD 550*c* being disposed between the mobile cargo controller 510 and the first antenna 562). The existence of the unobstructed line-of-site communication path 570 between the mobile cargo controller 510 and the third antenna 566 enhances the operation of the associated cargo handling system 500 in one or more respects.

Figure 8:
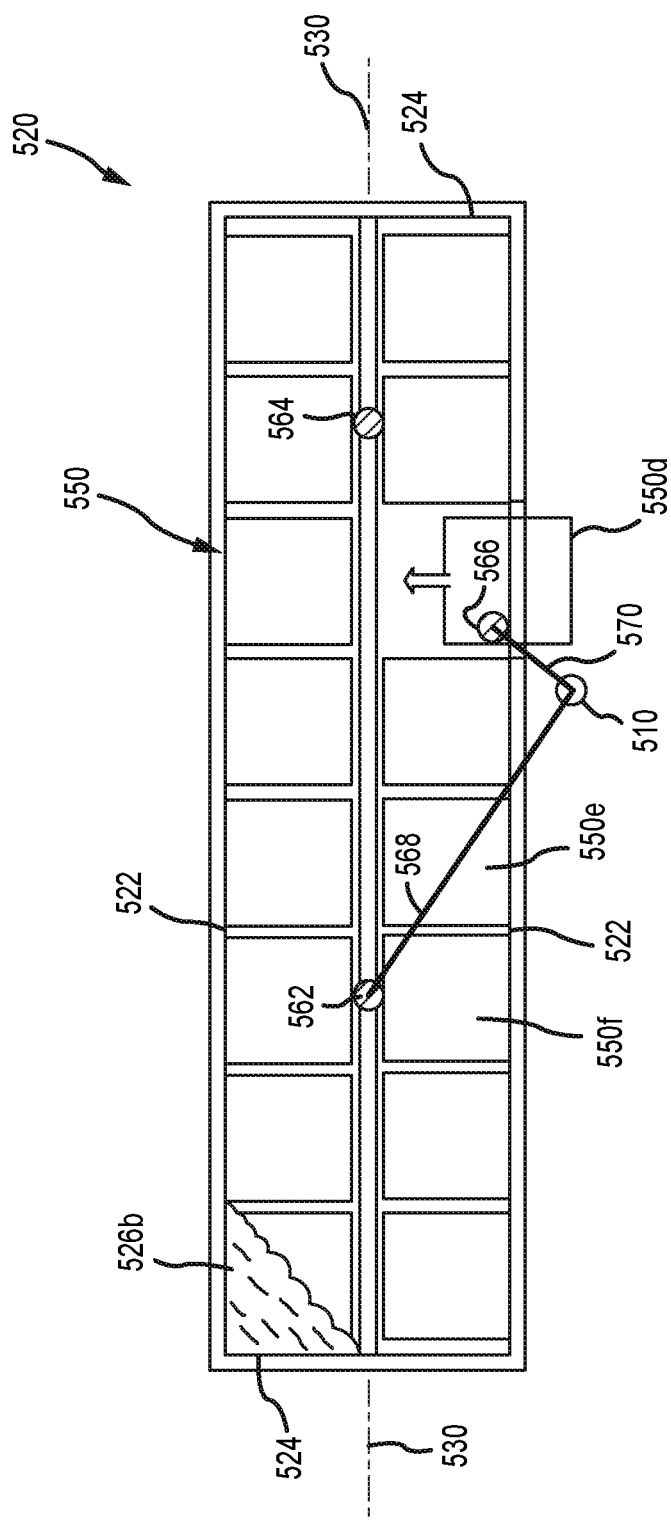
FIG. 8 is a schematic of a cargo bay that incorporates a distributed antenna system for a cargo handling system and with another representative ULD load configuration, in accordance with various embodiments.

FIG. 8 illustrates a different loading configuration of ULDs 550 for the cargo bay 520, but using the same distributed antenna system 512. With regard to using the mobile cargo controller 510 (positioned outside the cargo bay 520 in the case of FIG. 8) to move a ULD 550*d* into the cargo bay 520 and in the direction indicated by the arrow in FIG. 8, there is an unobstructed line-of-site communication path 570 between the third antenna 566 of the distributed antenna system 512 and the mobile cargo controller 510 that may be used to control operation of the relevant PDUs of the PDU system 516 via the control system 400 (FIG. 6). Note, however, that there is an obstructed line-of-site communication path 568 between the mobile cargo controller 510 and the first antenna 562 (via the ULDs 550*e*, 550*f* being disposed between the mobile cargo controller 510 and the first antenna 562). The existence of the unobstructed line-of-site communication path 570 between the mobile cargo controller 510 and the third antenna 566 enhances the operation of the associated cargo handling system 500 in one or more respects.

Individual antennas of the distributed antenna system 512 are preferably located within the cargo bay 520 such that there will always be at least one unobstructed line-of-site communication path between the mobile cargo controller 510 and an individual antenna of the distributed antenna system 512. There of course may be an unobstructed line-of-site communication path between the mobile cargo controller 510 and multiple antennas of the distributed antenna system 512. In this case, the antenna having the strongest signal from the mobile cargo controller 510 may be used by the control system 400 to control the PDU system 516. More generally, the strongest signal between the distributed antenna system 512 and the mobile cargo controller 510 may be used to control operation of the PDU system 516 based on input to the mobile cargo controller 510.

It should be appreciated that the mobile cargo controller 510 may be in communication with multiple individual antennas of the distributed antenna system 512 at a given location (whether the mobile cargo controller 510 is transmitting a signal to the base station 514 via the distributed antenna system 512 or whether the base station 514 is transmitting a signal to the mobile cargo controller 510), including one or more antennas of the distributed antenna system 512 that each have an obstructed line-of-site communication path between the mobile cargo controller 510 and an individual antenna, one or more antennas of the distributed antenna system 512 that each have an unobstructed line-of-site communication path between the mobile cargo controller 510 and an individual antenna, or any combination thereof. For instance, there may be a signal between each antenna of the distributed antenna system 512 and the mobile cargo controller 510. The strongest signal between the mobile cargo controller 510 and a given antenna of the distributed antenna system 512 may be used for communications between the mobile cargo controller 510 and base station 514.

Figure 9:
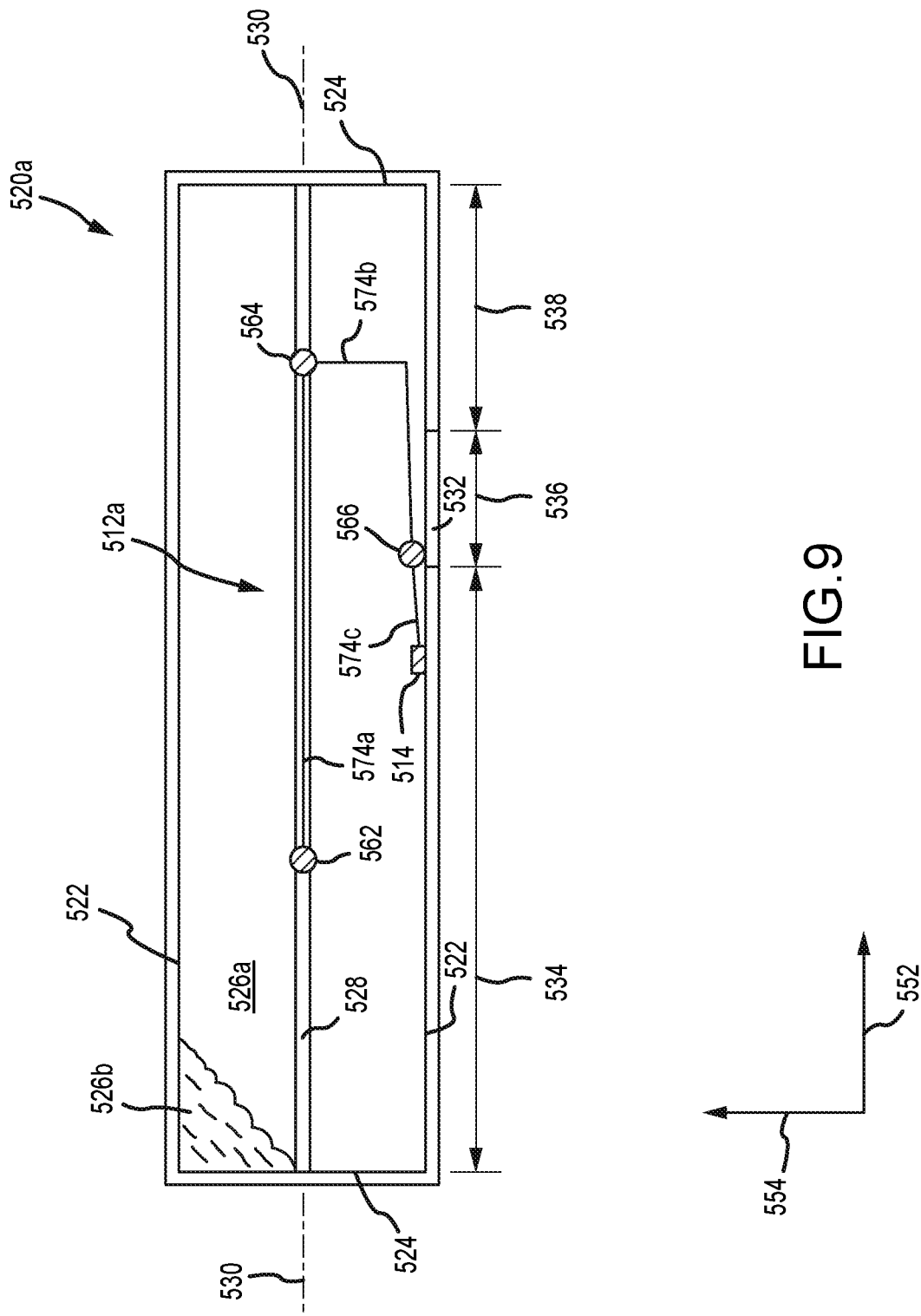
FIG. 9 is a schematic of a cargo bay that incorporates a distributed antenna system for a cargo handling system, with each antenna of the distributed antenna system being connected in series, in accordance with various embodiments.

An exemplary operative interconnection/arrangement for the distributed antenna system 512 of FIG. 6 is presented in FIG. 9 and is identified by reference numeral 512*a*. The first antenna 562, the second antenna 564, the third antenna 566, and the base station 514 are connected in series within the cargo bay 520*a*. For instance: 1) a first transmission line 574*a* (e.g., a coaxial cable) provides a series connection between the first antenna 562 and the second antenna 564; 2) a second transmission line 574*b* (e.g., a coaxial cable) provides a series connection between the second antenna 564 and the third antenna 566; and 3) a third transmission line 574*c* (e.g., a coaxial cable) provides a series connection between the third antenna 566 and the base station 514 (the base station 514 being in communication with the control system 400 (FIG. 6) in any appropriate manner (e.g., wired or wireless)).

Figure 10:
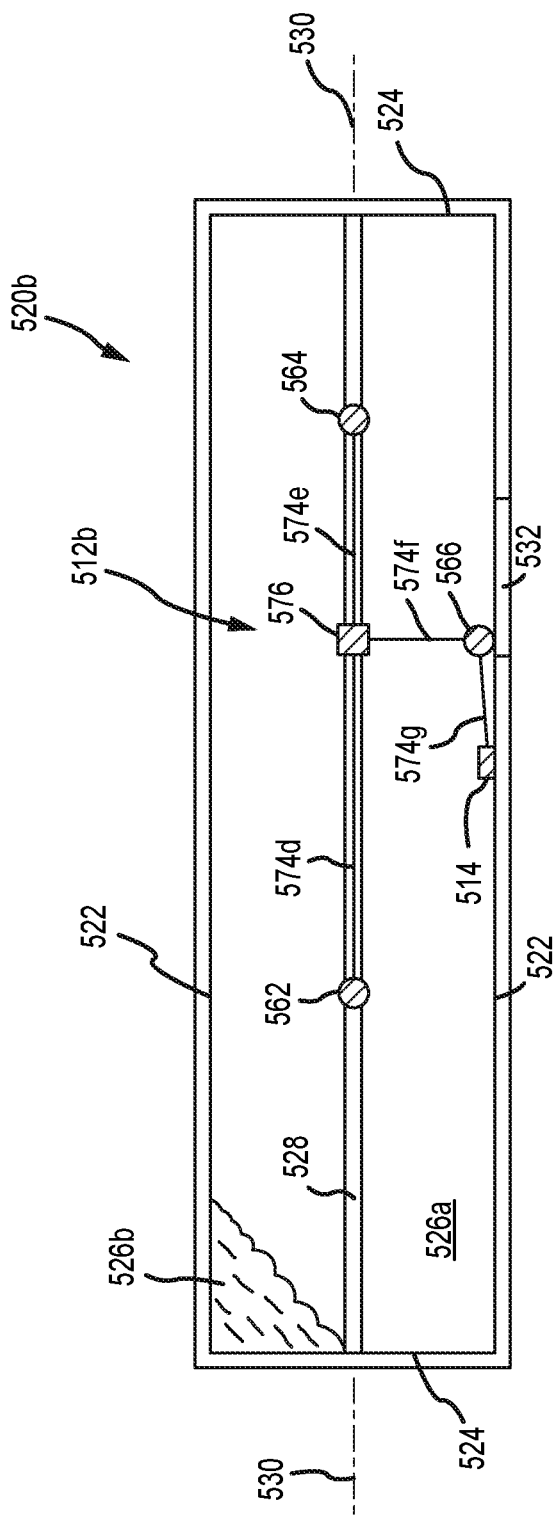
FIG. 10 is a schematic of a cargo bay that incorporates a distributed antenna system for a cargo handling system, where a signal splitter/combiner is disposed between a pair of antennas of the distributed antenna system, in accordance with various embodiments.
Figure 10:
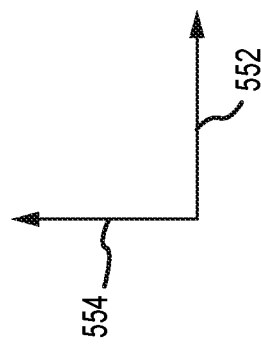

Another exemplary operative interconnection/arrangement for the distributed antenna system 512 of FIG. 6 is presented in FIG. 10 and is identified by reference numeral 512*b*. In relation to the distributed antenna system 512*b* for the cargo bay 520*b*: 1) a first transmission line 574*d* (e.g., a coaxial cable) provides a series connection between the first antenna 562 and a signal splitter/combiner 576; 2) a second transmission line 574*e* (e.g., a coaxial cable) provides a series connection between the second antenna 564 and the signal splitter/combiner 576; 3) a third transmission line 574*f* provides a series connection between the signal splitter/combiner 576 and the third antenna 566; and 3) a fourth transmission line 574*g* provides a series connection between the third antenna 566 and the base station 514 (the base station 514 being in communication with the control system 400 (FIG. 6) in any appropriate manner (e.g., wired or wireless)).

Figure 11:
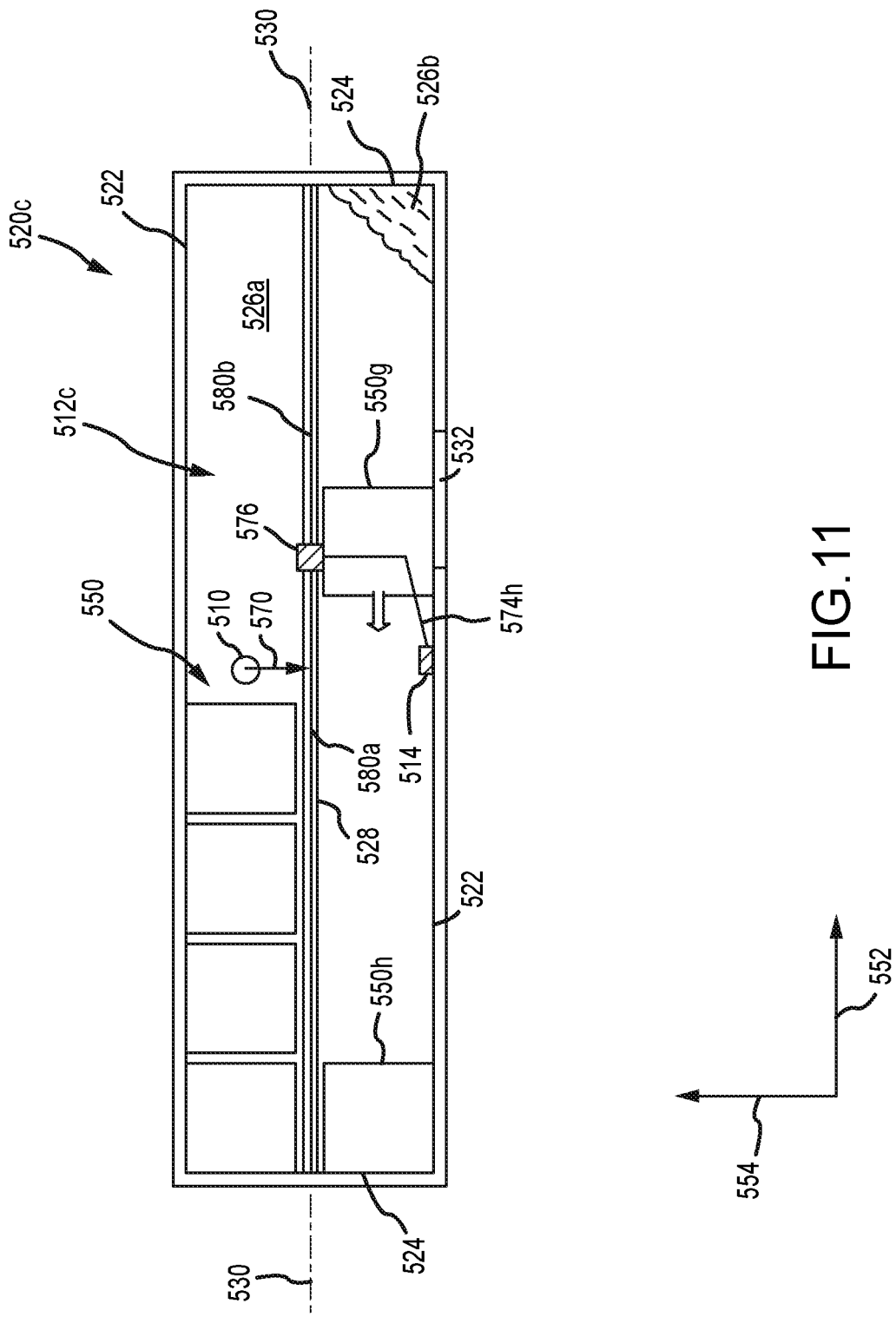
FIG. 11 is a schematic of a cargo bay that incorporates a distributed antenna system for a cargo handling system, where the distributed antenna system includes a pair of leaky feeder antennas, in accordance with various embodiments.

Another exemplary operative interconnection/arrangement for the distributed antenna system 512 of FIG. 6 is presented in FIG. 11 and is identified by reference numeral 512*c*. The distributed antenna system 512*c* for the cargo bay 520*c* includes a first leaky feeder antenna 580*a* and a second leaky feeder antenna 580*b*. The first leaky feeder antenna 580*a* extends longitudinally in the first dimension 522 between one of the end walls 524 of the cargo bay 520*c* and a signal splitter/combiner 576 (within the central longitudinal region 528 and including at least generally along the central longitudinal axis 530), while the second leaky feeder antenna 580*b* extends longitudinally in the first dimension 522 between the other of the end walls 524 of the cargo bay 520*c* and the signal splitter/combiner 576 (also within the central longitudinal region 528 and including at least generally along the central longitudinal axis 530). As such, the first leaky feeder antenna 580*a* and the second leaky feeder antenna 580*b* are disposed in non-overlapping relation within the first dimension 552. A series connection exists between the signal splitter/combiner 576 and the base station 514 (via a transmission line 574*h*, for instance a coaxial cable). The base station 514 is in communication with the control system 400 (FIG. 6) in any appropriate manner (e.g., wired or wireless).

With regard to using the mobile cargo controller 510 to move a ULD 550*g* within the cargo bay 520*c*, in the direction indicated by the arrow in FIG. 11, and toward a ULD 550*h*, there is an unobstructed line-of-site communication path 570 between the mobile cargo controller 510 and the first leaky feeder antenna 580*a* of the distributed antenna system 512*c* that may be used to control operation of the relevant PDUs of the PDU system 516 via the control system 400 (FIG. 6). In the event that the mobile cargo controller 510 was positioned to the right of the ULD 550*g* in the view shown in FIG. 11 (for instance adjacent to the sidewall 522 that incorporates the cargo bay access opening 532), an unobstructed line-of-site communication path would exist between the mobile cargo controller 410 and the second leaky feeder antenna 580b (however, there would be an obstructed line-of-site communication path between the mobile cargo controller 510 and the first leaky feeder antenna 580a in this instance—via the ULD 550g being disposed between the mobile cargo controller 510 and the first leaky feeder antenna 580a). The existence of the unobstructed line-of-site communication path 570 between the mobile cargo controller 510 and either of the first leaky feeder antenna 580a or the second leaky feeder antenna 580b enhances the operation of the associated cargo handling system 500 in one or more respects.

Figure 12:
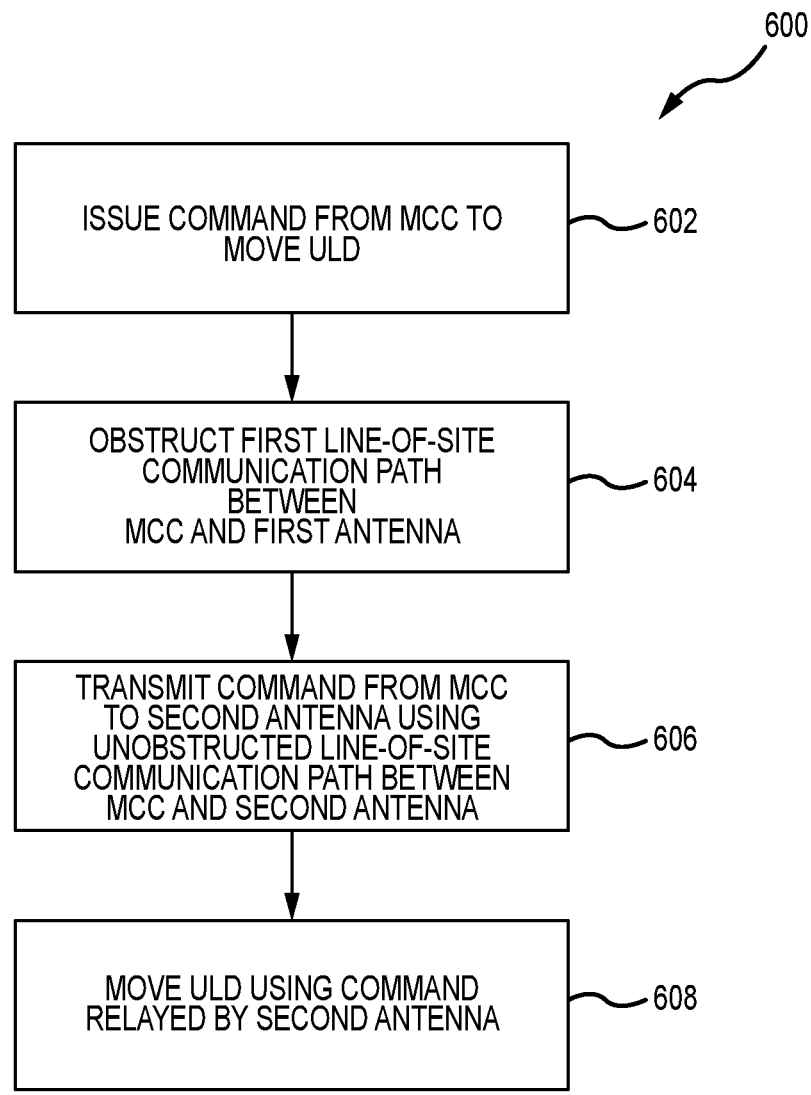
FIG. 12 illustrates a method for moving a ULD using a distributed antenna system.

A method of operating a cargo handling system (e.g., cargo handling system 500 of FIG. 6) is illustrated in FIG. 12 and is identified by reference numeral 600. The method includes issuing a command from a mobile cargo controller to move a ULD (602). The mobile cargo controller could be located inside or outside a cargo bay, and the ULD may be located at least partially inside or at least partially outside the cargo bay for purposes of this movement command (602). An obstructed line-of-site communication path exists between the mobile cargo controller and a first antenna of a distributed antenna system when attempting to use the mobile cargo controller to move a ULD (604). However, an unobstructed line-of-site communication path exists between the mobile cargo controller and a second antenna of the distributed antenna system such that the command from the mobile cargo controller may be transmitted from the mobile cargo controller to the second antenna (606). As the signal between the second antenna of the distributed antenna system and the mobile cargo controller (unobstructed line-of-site communication path) should be larger than the signal between the first antenna of the distributed antenna system and the mobile cargo controller (obstructed line-of-site communication path), the command from the mobile cargo controller may be relayed by the second antenna (e.g., to base station 514 and/or to control system 400) such that the command moves the ULD (608). That is, the signal from the mobile cargo controller, as received by the second antenna, may be used to control movement of the ULD (608).

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
   a cargo bay comprising a cargo deck, a first sidewall, and a second sidewall, wherein said first sidewall and said second sidewall each have a length dimension that coincides with a first dimension, wherein said first sidewall and said second sidewall are spaced from each other in a second dimension that corresponds with a width dimension of said cargo bay;
　　a plurality of power drive units associated with said cargo deck;
　a central longitudinal region location between said first and second sidewalls in said second dimension and extending longitudinally in said first dimension;
　a distributed antenna system comprising a first antenna and a second antenna that are each disposed in said central longitudinal region and that are separate antennas, wherein said first antenna and said second antenna occupy different positions in said first dimension; and
　a base station operatively interconnected with each of said first antenna, said second antenna, and said plurality of power drive units.

2. The cargo handling system of claim 1, wherein said first antenna and said second antenna are disposed in non-overlapping relation in said first dimension.

3. The cargo handling system of claim 1, wherein said first antenna and said second antenna are spaced from each other in said first dimension.

4. The cargo handling system of claim 1, wherein said first antenna and said second antenna are each selected from the group consisting of monopole, dipole, slot, or patch antennas.

5. The cargo handling system of claim 1, wherein said first antenna, said second antenna, and said base station are connected in series.

6. The cargo handling system of claim 1, further comprising:
　a signal splitter/combiner;
　a first series connection between said signal splitter/combiner and said first antenna;
　a second series connection between said signal splitter/combiner and said second antenna; and
　a third series connection between and said signal splitter/combiner and said base station.

7. The cargo handling system of claim 6, further comprising:
　a cargo bay access opening to said cargo bay; and
　a third antenna disposed at said cargo bay access opening and a separate antenna from said first and second antennas, wherein said distributed antenna system further comprises said third antenna.

8. The cargo handling system of claim 7, wherein said third antenna is disposed between said signal splitter/combiner and said base station in said third series connection.

9. The cargo handling system of claim 1, further comprising:
　a cargo bay access opening to said cargo bay; and
　a third antenna disposed at said cargo bay access opening and a separate antenna from said first and second antennas, wherein said distributed antenna system further comprises said third antenna.

10. The cargo handling system of claim 9, wherein said third antenna is operatively interconnected with said base station.

11. The cargo handling system of claim 1, wherein said first antenna and said second antenna are each a leaky feeder antenna.

12. The cargo handling system of claim 11, wherein each of said first antenna and said second antenna have a length dimension that extends in said first dimension.

13. The cargo handling system of claim 11, further comprising:
　a signal splitter/combiner, wherein each of said first antenna and said second antenna are operatively connected with said signal splitter/combiner; and
　a series connection between and said signal splitter/combiner and said base station.

14. The cargo handling system of claim 1, wherein said cargo bay further comprises a roof, and wherein said first antenna and said second antenna are each mounted to said roof.

15. The cargo handling system of claim 1, further comprising:
　a mobile cargo controller in communication with said distributed antenna system.

16. The cargo handling of claim 15, further comprising a control system operatively interconnected with said base station, wherein said control system provides said operative interconnection between said base station and said plurality of power drive units, and wherein all communications between said distributed antenna system and said control system are provided through said base station.

17. A method of operating a cargo handling system, comprising:
　issuing a command, from a first location and using a mobile cargo controller, to move a first unit load device (ULD) within a cargo bay;
　obstructing a first line-of-site communication path between said mobile cargo controller and a first antenna of a distributed antenna system during said issuing;
　transmitting said command from said mobile cargo controller to a second antenna of said distributed antenna system using a second line-of-site communication path between said mobile cargo controller and said second antenna that is unobstructed; and
　moving said first ULD, within said cargo bay, using said command relayed by said second antenna.

18. The method of claim 17, wherein said first location is one of inside said cargo bay and outside said cargo bay.

19. The method of claim 17, wherein said obstructing comprises a second ULD being positioned within said cargo bay in said first line-of-site communication path between said mobile cargo controller and said first antenna.

20. The method of claim 17, wherein said relaying comprises transmitting said command from said second antenna to a base station, wherein said moving is executed in response to said base station receiving said command from said second antenna.

* * * * *